United States Patent
Nadir et al.

(10) Patent No.: US 6,291,912 B1
(45) Date of Patent: *Sep. 18, 2001

(54) ELECTRIC MOTOR, IN PARTICULAR FOR MOTOR VEHICLE, WITH IMPROVED COOLING RADIATOR

(75) Inventors: Noureddine Nadir, Paris; Hervé Couetoux, Saint Remy les Chevreuse; Mathieu Chanfreau, Vanves; Laurent Rochelle, Maurepas, all of (FR)

(73) Assignee: Valeo Climatisation, La Verriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,013

(22) PCT Filed: Jul. 13, 1998

(86) PCT No.: PCT/FR98/01531

§ 371 Date: Mar. 17, 1999

§ 102(e) Date: Mar. 17, 1999

(87) PCT Pub. No.: WO99/04480

PCT Pub. Date: Jan. 28, 1999

(30) Foreign Application Priority Data

Jul. 17, 1997 (FR) .................................................. 97 09094

(51) Int. Cl.$^7$ ......................................................... H02K 1/32
(52) U.S. Cl. ............................. 310/64; 310/68 R; 310/89
(58) Field of Search .............................. 310/64, 62, 67 R, 310/68 R, 66, 89

(56) References Cited

U.S. PATENT DOCUMENTS

| | | | |
|---|---|---|---|
| 4,712,030 | * 12/1987 | Lakin et al. | 310/89 |
| 4,795,997 | * 1/1989 | Fisher et al. | 337/380 |
| 5,049,769 | 9/1991 | Reinhardt et al. . | |
| 5,087,497 | 2/1992 | Suzuki et al. . | |
| 5,095,239 | * 3/1992 | Wang | 310/221 |
| 5,296,770 | * 3/1994 | Pflueger et al. | 310/114 |
| 5,763,969 | * 6/1998 | Metheny et al. | 310/62 |
| 5,770,903 | * 6/1998 | Bland et al. | 310/64 |
| 5,783,881 | * 7/1998 | Best et al. | 310/68 C |
| 5,825,107 | * 10/1998 | Johnson et al. | 310/64 |

FOREIGN PATENT DOCUMENTS

| | | |
|---|---|---|
| 3 842 588 | 6/1990 | (DE) . |
| 682 396 | 11/1995 | (EP) . |
| 2 430 686 | 1/1980 | (FR) . |

OTHER PUBLICATIONS

International Search Report dated Nov. 17, 1998.

* cited by examiner

Primary Examiner—Elvin Enad
Assistant Examiner—Thanh Lam
(74) Attorney, Agent, or Firm—Morgan & Finnegan, LLP

(57) ABSTRACT

An electric motor, in particular for motor vehicles, supports a control circuit board (7) with electronic components and including a heatsink (12) for evacuating heat radiated by some of the electronic components. The heatsink (12) is attached to a collar (11) immobilized relative to the motor (2) and surrounding the board (7) and has a housing (13) to receive at least some of said electronic components radiating heat in order to connect them to the control circuit.

15 Claims, 2 Drawing Sheets

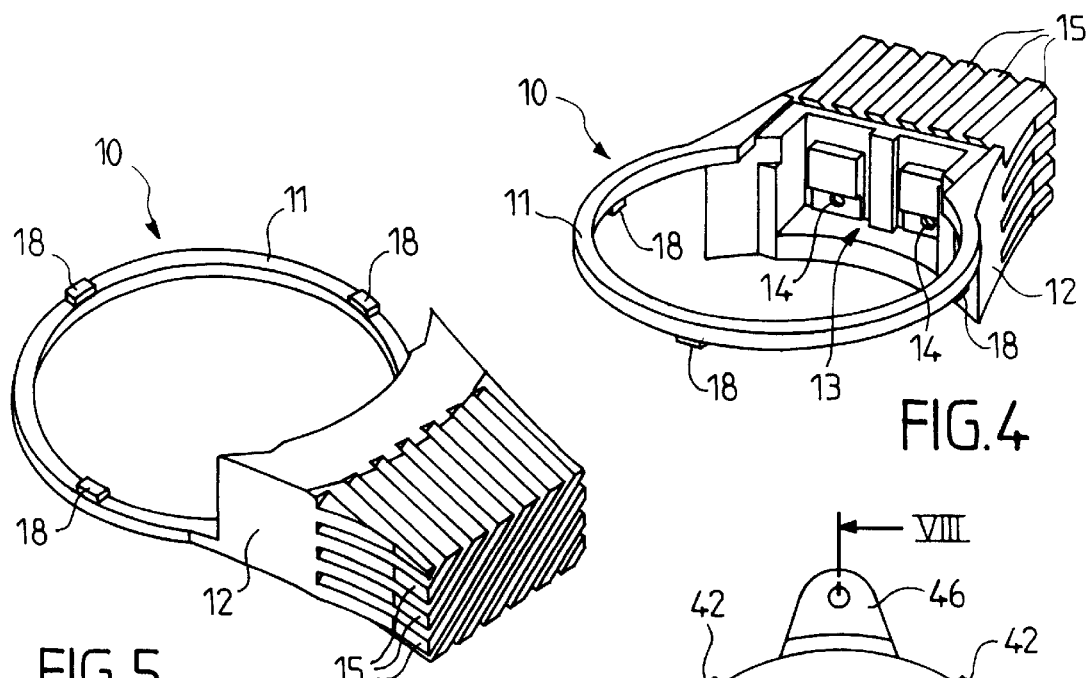
FIG.4
FIG.5
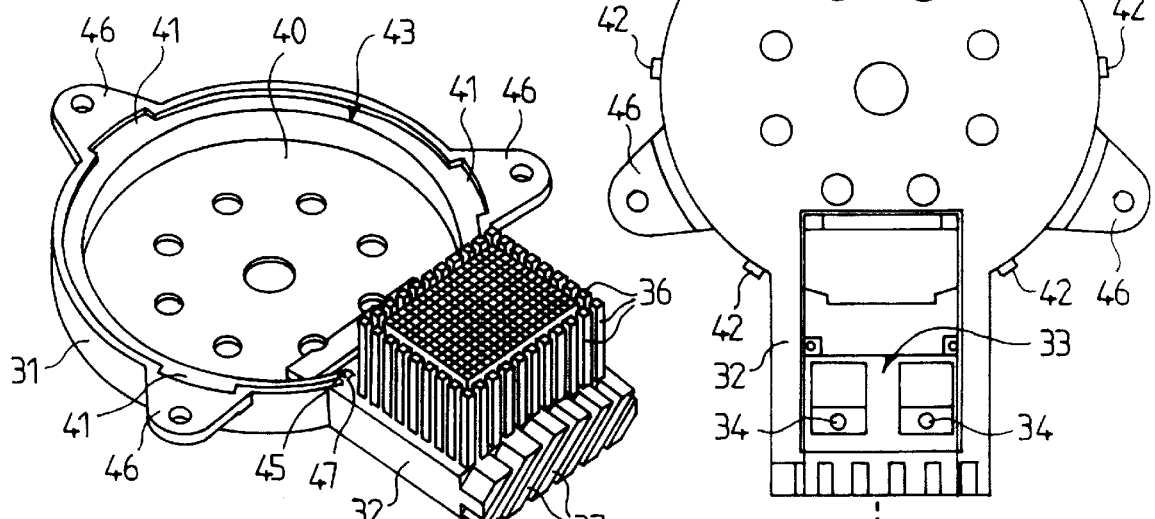
FIG.6
FIG.7
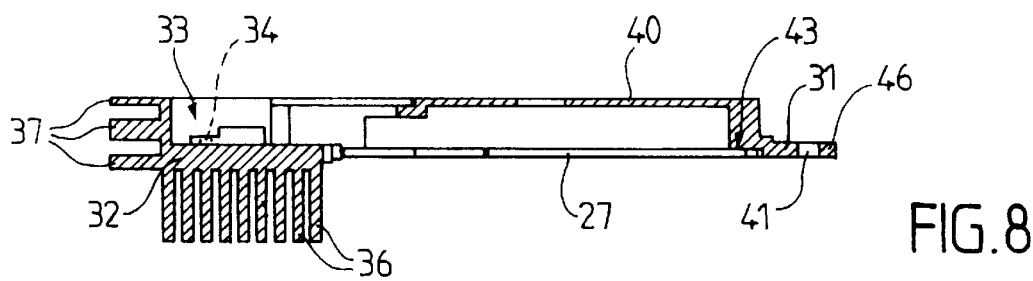
FIG.8

ELECTRIC MOTOR, IN PARTICULAR FOR MOTOR VEHICLE, WITH IMPROVED COOLING RADIATOR

BACKGROUND OF THE INVENTION

The invention concerns the field of electric motors, in particular for motor vehicles, and more particularly their control circuit.

In some such motors the control circuit, which is on a circuit board, controls the operating conditions of the motor and consequently includes electronic components, in particular power electronic components, that radiate a significant quantity of heat when operating. Such components, for example power transistors, are generally cooled by a heatsink.

The heat that is radiated is mainly evacuated to the heatsink by conduction via the board carrying the control circuit. This causes heating of the other components of the control circuit and in particular of the copper tracks, which can in some cases damage electronic components and the soldered joints by which components are interconnected.

Integrated circuits able to withstand high temperatures can be used, of course, but such circuits are very costly.

The solutions known per se are therefore not entirely satisfactory.

Consequently, one aim of the invention is to procure an electric motor that does not have the drawbacks of the prior art motors.

BRIEF SUMMARY OF THE INVENTION

To this end the invention proposes a motor of the type defined in the introduction in which, on the one hand, a collar is provided adapted to be immobilised relative to the motor in a position in which it surrounds the board and to retain the heatsink at the periphery of the body of the motor and, on the other hand, the heatsink includes a housing adapted to receive at least some of the electronic components that radiate heat at a location suitable for connecting them to the control circuit.

In this way the electronic components which radiate a great deal of heat are isolated from the other components, without increasing the overall size of the motor.

The collar and the motor preferably comprise respective co-operating means of like shape enabling at least partial immobilisation of the former (collar) relative to the latter (motor).

In a first embodiment the collar is attached to a flange forming a cover adapted to protect the control circuit board and the part of the motor that supports it, the collar preferably being immobilised relative to the motor by crimping lugs carried by said motor.

Radial lugs can equally be provided on the collar to enable the motor to be fixed to a support, for example a housing.

In a second embodiment the motor includes a flange that forms the cover and includes crimping lugs enabling it and the board to be immobilised relative to the motor.

The collar and the heatsink could be made separately and fastened together, for example, by providing an opening in the collar shaped to receive a like part of the heatsink. The heatsink and the collar could equally be in one piece, however.

In one particular application of the invention the electric motor drives a fan at varying speeds. In this case it is particularly advantageous for the heatsink to include cooling fins with respective shapes and orientations adapted to suit the flow of air produced by the fan. This improves the efficiency of the heatsink.

A motor of the above kind could be part of a motor-fan unit, for example, in particular in a motor vehicle heating, ventilation and/or air conditioning installation.

BRIEF DESCRIPTION OF THE DRAWINGS

The following description is given by way of example with reference to the accompanying drawings, in which:

FIGS. 4 and 5 show the collar and the heatsink from FIGS. 1 to 3 as seen in two different directions;

FIG. 6 is a perspective view of a second embodiment of part of an electric motor in accordance with the invention;

FIG. 7 is a plan view of the component shown in FIG. 6; and

FIG. 8 is a view in section taken along the line VIII—VIII in FIG. 7.

DETAILED DESCRIPTION OF DRAWINGS

Figure 1:
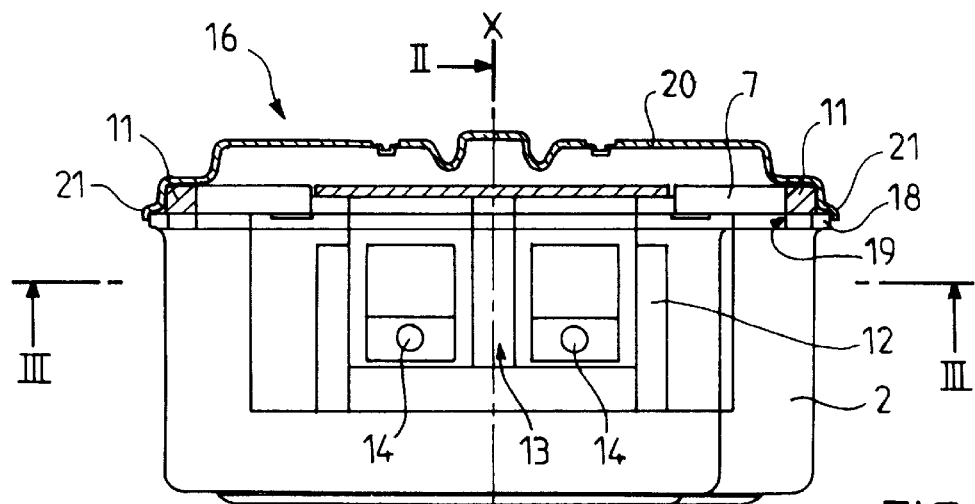
FIG. 1 is a cross-sectional view of a first embodiment of an electric motor in accordance with the invention.

A first embodiment of an electric motor in accordance with the invention will be described first with reference to FIGS. 1 to 5. In the examples described the electric motor is adapted to rotate at varying speeds a fan 1 adapted to impart motion to air to be fed to a radiator, for example in a motor vehicle. Of course, the invention is not limited to electric motors driving a fan but equally concerns, in particular, electric motors driving a turbine of a motor-fan unit of a motor vehicle heating and ventilation installation.

The electric motor shown in the figures has a body 2 adapted to rotate about an axis XX a shaft 3 attached to a fan 1 generally comprising a plurality of blades 22 adapted to produce a flow of air.

An electric motor of the above kind can be of the DC type with brushes or of the induction type. In the example shown (see FIG. 3 in particular) the electric motor is of the DC type with brushes. The brushes 4 make contact with copper tracks 5 some of which are connected to a power supply and others of which are connected to power resistors. In the following description the expression "electronic component" refers to components supplying power to the electric motor and controlling its operating conditions. The electronic components that more particularly control the operating conditions of the motor are installed on a control circuit board 7. They include copper tracks 5, connectors 9, inductors 8 and capacitors and fuses (not shown). The power electronic components adapted more particularly to supply power to the electric motor are generally switching mode semiconductor components. Such components can be used in power amplifiers with power ratings in the range 250 W to 600 W.

In accordance with the invention, to prevent the power components that radiate significant quantities of heat interfering with (or damaging) other electronic components of the control and power supply circuits, the latter are not installed on the board 7 but on an attached unit 10 that will now be described.

In the example shown in FIGS. 1 to 5 the attached unit 10 includes a circular collar 11 adapted to surround the board 7.

Clearly the shape of the collar 11 depends on that of the board 7. Consequently, it could have other shapes.

As shown more clearly in FIGS. 4 and 5, the collar 11 is fastened to a heatsink 12 adapted to evacuate the heat radiated by some power components of the electric motor control and power supply circuit.

To allow such evacuation of heat the heatsink 12 has a housing 13 adapted to receive power electronic components which radiate a great deal of heat, such as power transistors, power diodes, smoothing inductors, filter capacitors, etc.

Figure 2:
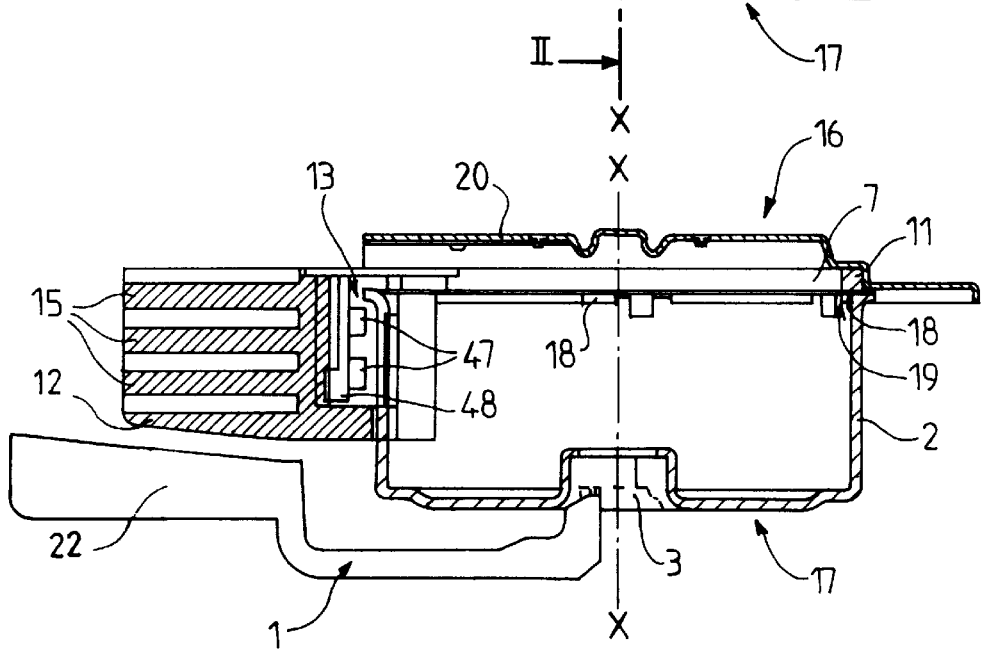
FIG. 2 is a view in section taken along the line II—II in FIG. 1.

Fixing means such as screwthreaded holes 14, for example, are provided to enable at least some of these power electronic components to be fixed in the housing 13. As shown in FIG. 2, the screw threaded holes 14 can be used to fix a board 48 on which the components 47 radiating a significant quantity of heat are mounted. In this way the heat radiated by the power electronic components housed in the housing 13 can be efficiently transferred by conduction to the heatsink 12.

The heatsink 12 has a multiplicity of cooling fins 15 which increase the surface area of heat exchange with the air and consequently improve the efficiency of evacuation of heat radiated by the power electronic components.

In the example shown the control circuit board 7 is installed on the "top" part 16 of the body 2 of the electric motor, opposite the "bottom" part 17 where the fan 1 is installed.

The collar 11 of the attached unit 10 is at the same level as the board 7 in this top part 16, and so the heatsink 12, to which said collar is attached, is at the periphery of the body 2 of the electric motor. Means with co-operating shapes are provided on the collar 11 and on the body of the motor to immobilise the collar circumferentially. Here the means on the collar 11 are projections 18 adapted to engage in like housings 19 in the body 2 of the electric motor. What is more, to enable axial immobilisation (along the rotation axis XX) of the board 7 and of the collar 11 a top flange 20 is provided, forming a cover and having crimping lugs 21 adapted to be bent over edges of the body 2 of the electric motor. Thus after the crimping lugs 21 are bent, the board 7 and the collar 11 are completely immobilised relative to the body 2 of the electric motor and are also protected.

Because of the peripheral position of the heatsink 12, its efficiency can be improved by making use of the air to which rotation is imparted by the blades 22 of the fan 1. The cooling fins 15 are therefore adapted to suit the flow of air to which rotation is imparted in this way. In the FIGS. 4 and 5 examples the fins are oblique to the axial direction XX and so the air to which movement is imparted by the blades 22 of the fan 1 washes over their faces. Of course the shapes and dimensions of the fins of the heatsink 12 could vary according to the configuration of the electric motor and in particular the shape of the blades 22 of its fan 1.

Figure 3:
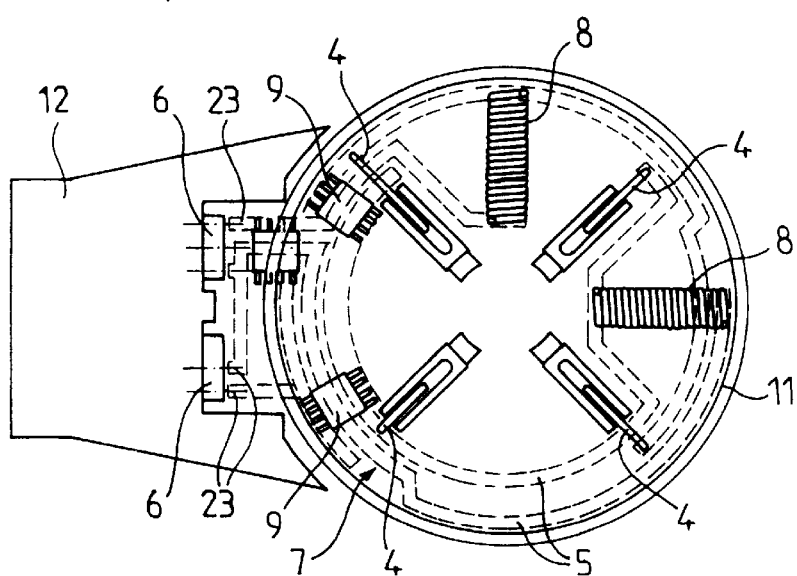
FIG. 3 is a view in section taken along the line III—III in FIG. 1.

The housing 13 is formed in the heatsink 12 at a location chosen so that the components it houses, possibly on an auxiliary board 48 (see FIG. 2), can easily be connected to the ends 23 of the copper tracks 5 on the board 7 (see FIG. 3). Such connection can be effected, for example, by close contact between the board 7 and the attached unit 10 when assembling the electric motor.

In this first embodiment the attached unit 10 is preferably in one piece, the collar 11 and the heatsink 12 being cast from a material based on aluminium, for example.

A second embodiment of the invention will now be described with reference to FIGS. 6 to 8.

What essentially differentiates the second embodiment from the first embodiment shown in FIGS. 1 to 5 is that here only the collar 31 and the flange forming the cover 40 are in one piece, to which a heatsink 32 is attached in a circumferential opening 45 of the collar 31 adapted for this purpose.

Of course, as an alternative to this, the heatsink 32, the collar 31 and the flange forming the cover 40 can be in one piece, for example cast from a material based on aluminium.

In the example shown in FIGS. 6 to 8 the heatsink 32 has a housing 33 (see FIG. 8) adapted to receive the power electronic components that radiate a significant amount of heat. As in the first embodiment, immobilising means 34 are provided in this housing for fixing the electronic components. Here the construction of the heatsink 32 is significantly different from that shown in the first embodiment. There are preferably two series of fins, a first series consisting of axial studs 36 oriented substantially parallel to the rotation axis XX of the electric motor and a second series of fins 37 oblique to the first fins 36.

The collar 31 is immobilised relative to the body 2 of the electric motor by means with co-operating shapes. Here the means on the collar 31 are openings 41 adapted to receive projections formed on the top part 16 of the body 2 of the electric motor (not shown in the figures). The collar 31 is preferably immobilised axially (in the direction of the axis XX relative to the body of the electric motor by crimping lugs 42 on the top part 16 of the body 2 of the electric motor adapted to be bent over areas provided for this purpose at the outside periphery of the collar 31. This axial immobilisation also immobilises the control circuit board 27 relative to the top part 16 of the body 2 of the electric motor because the cover 40 has bearing surfaces 43 that apply axial pressure to said board 27.

As shown in FIGS. 6 to 8, fixing lugs 46 can equally be provided at the periphery of the collar 31 for installing the motor on a housing or on a support.

The invention is not limited to the embodiments described hereinabove but encompasses any variations that may suggest themselves to the skilled person within the scope of the following claims.

Thus the shapes of the collar and of the heatsink are not limited to the examples shown in the accompanying drawings.

Finally, a DC motor with brushes has been described but it is clear that the invention applies to other types of electric motor, in particular induction motors.

What is claimed is:

1. An electric motor comprising a body supporting a control circuit with at least one power electronic component and a circuit board bearing at least one heat sensitive electronic component and including a heatsink adapted to evacuate by conduction heat previously radiated by said at least one power electronic component;

a collar immobilized relative to said motor, said collar surrounding said circuit board and holding said heatsink at a periphery of the body, said heatsink having a housing adapted to receive said at least one power electronic component at a location configured to provide connection to the control circuit, wherein said heatsink and said collar are in one piece.

2. A motor according to claim 1 wherein said collar and said motor comprises respective means with co-operating shapes for immobilizing said collar relative to said motor.

3. A motor according to claim 1 wherein said collar is attached to a flange forming a cover adapted to protect said board and the body.

4. A motor according to claim 3 wherein said collar carries a plurality of radial lugs for fixing said motor to a support.

5. A motor according to claim 3 wherein said collar further comprises a plurality of crimping lugs for immobilizing said collar relative to said motor.

6. A motor according to claim 3 wherein said collar has a shaped opening adapted to fasten said collar to said heatsink.

7. A motor according to claim 1 wherein said collar includes a flange forming a cover adapted to protect said board and the body and including a plurality of crimping lugs adapted to immobilize the body and said board relative to said motor.

8. A motor according to claim 1 wherein said collar and said board have generally substantially circular shapes.

9. A motor according to claim 1 wherein said motor is adapted to rotate a fan at varying speeds.

10. A motor according to claim 9 wherein said heatsink includes a plurality of fins with respective shapes and orientations adapted to suit a flow of air to which movement is imparted by said fan.

11. A motor according to claim 9 wherein said motor is part of a motor-fan unit, in particular of a heating, ventilation and/or air conditioning installation.

12. A motor assembly comprising a body;

a circuit board disposed on the body, the circuit board having at least one heat sensitive electronic component forming part of a control circuit;

a collar surrounding the circuit board; and a heatsink disposed on a periphery of the body, the heatsink including a housing for supporting at least one power electronic component forming part of said control circuit, wherein said heatsink and said collar are in one piece.

13. A motor assembly comprising a body, a circuit board disposed on the body, the circuit board having a first plurality of electronic components, a support member including a collar disposed around the circuit board, a heatsink in one piece with the collar, the heatsink being disposed on a periphery of the body, the heatsink including a housing in which is disposed a second plurality of electronic components, wherein the second plurality of electronic components includes at least one power electronic component, and wherein the first plurality of electronic components includes at least one heat sensitive electronic component.

14. A motor assembly according to claim 13 wherein the collar is immobilized circumferentially relative to the body.

15. A motor assembly according to claim 13 which further comprises a cover member.

* * * * *